(12) United States Patent
Dozortsev

(10) Patent No.: US 11,991,176 B2
(45) Date of Patent: May 21, 2024

(54) CONTROLLED METHOD AND SYSTEM FOR SECURE INFORMATION SHARING

(71) Applicant: Dmitri Dozortsev, Katy, TX (US)

(72) Inventor: Dmitri Dozortsev, Katy, TX (US)

(*) Notice: Subject to any disclaimer, the term of this patent is extended or adjusted under 35 U.S.C. 154(b) by 0 days.

(21) Appl. No.: 14/540,848

(22) Filed: Nov. 13, 2014

(65) Prior Publication Data

US 2015/0134529 A1 May 14, 2015

Related U.S. Application Data

(60) Provisional application No. 61/939,527, filed on Feb. 13, 2014, provisional application No. 61/932,353, filed on Jan. 28, 2014, provisional application No. 61/928,856, filed on Jan. 17, 2014, provisional application No. 61/903,728, filed on Nov. 13, 2013.

(51) Int. Cl.
H04L 9/40 (2022.01)
G06F 16/9535 (2019.01)

(52) U.S. Cl.
CPC ........ H04L 63/10 (2013.01); *H04L 2463/102* (2013.01)

(58) Field of Classification Search
CPC .............. H04L 63/10; H04L 2463/102; G06F 17/30867; G06F 16/9535
USPC ......................................................... 705/50
See application file for complete search history.

(56) References Cited

U.S. PATENT DOCUMENTS

| | | | |
|---|---|---|---|
| 6,111,495 A * | 8/2000 | Garside .................. | G04G 21/06 340/309.7 |
| 7,373,392 B2 | 5/2008 | Nishihara et al. | |
| 7,395,050 B2 | 7/2008 | Tuomi et al. | |
| 7,930,253 B1 * | 4/2011 | Schoenhals ........... | H04L 67/535 705/26.1 |
| 8,091,120 B2 | 1/2012 | Perrella et al. | |
| 8,306,908 B1 * | 11/2012 | Barker ............... | G06Q 30/0224 705/26.7 |
| 8,423,759 B2 | 4/2013 | Moreau | |
| 8,464,322 B2 | 6/2013 | Narjala | |
| 8,849,791 B1 * | 9/2014 | Hertschuh .......... | G06Q 30/0641 707/713 |

(Continued)

OTHER PUBLICATIONS

Ron White, How Computers Work, Oct. 15, 2003, Paul Boger, Illustrated by Timothy Edward Downs, 7th Edition (Year: 2003).*

*Primary Examiner* — Mohammad A. Nilforoush
*Assistant Examiner* — Wodajo Getachew
(74) *Attorney, Agent, or Firm* — Levine's Tech Consulting LLC; Frank E. Levine

(57) ABSTRACT

A method between an end-point networked device of a sending user (SU) and an end-point networked device of a receiving user (RU) is provided that includes registering the end-point device of the SU in the networked database by issuance of a Unique ID (UID) for the end-point device of the SU. The SU enters information into the end-point device of the SU and supplies the UID to the RU. The RU enters the UID into the end-point device of the RU, a web browser, or another end-point device database interface to generate a query requesting the information from the end-point device of the SU. The information is transmitted to the end-point device of the RU, the web browser or the other end-point device database interface. A material or other request is completed based on the information. A system is also provided that facilitates the aforementioned methods.

5 Claims, 3 Drawing Sheets

(56) References Cited

U.S. PATENT DOCUMENTS

| | | | |
|---|---|---|---|
| 2002/0035474 A1* | 3/2002 | Alpdemir | G10L 15/26 704/270.1 |
| 2003/0069856 A1* | 4/2003 | Seifert | G06Q 40/02 705/73 |
| 2004/0196828 A1 | 10/2004 | Wells et al. | |
| 2004/0236590 A1* | 11/2004 | Visser | G06Q 30/016 705/304 |
| 2005/0044224 A1* | 2/2005 | Jun | G06Q 40/00 709/225 |
| 2006/0090073 A1 | 4/2006 | Steinberg et al. | |
| 2006/0280191 A1 | 12/2006 | Nishida et al. | |
| 2007/0028113 A1 | 2/2007 | Moskowitz | |
| 2008/0037720 A1* | 2/2008 | Thomson | H04M 3/4931 704/E15.044 |
| 2008/0091770 A1 | 4/2008 | Petras et al. | |
| 2009/0037520 A1 | 2/2009 | Loffredo | |
| 2011/0029436 A1 | 2/2011 | Norvell et al. | |
| 2011/0072499 A1 | 3/2011 | Lin | |
| 2011/0276496 A1* | 11/2011 | Neville | G06Q 20/04 705/75 |
| 2011/0307355 A1* | 12/2011 | Khalil | G06Q 30/06 715/752 |
| 2012/0102331 A1 | 4/2012 | Russo | |
| 2012/0197765 A1* | 8/2012 | Kim | G06Q 30/0601 705/27.1 |
| 2013/0179521 A1* | 7/2013 | Hu | H04W 76/40 709/206 |
| 2013/0185770 A1* | 7/2013 | Patil | H04L 63/08 726/4 |
| 2013/0198037 A1 | 8/2013 | Moskowitz | |
| 2013/0205381 A1 | 8/2013 | Cain | |
| 2014/0025469 A1* | 1/2014 | Mishuku | G06Q 30/0225 705/14.26 |
| 2014/0351071 A1* | 11/2014 | Hong | G06Q 20/204 705/20 |
| 2015/0206126 A1* | 7/2015 | Zeinecker | G06Q 20/3255 705/44 |
| 2016/0350825 A1* | 12/2016 | Hertschuh | G06Q 30/0617 |

\* cited by examiner

CONTROLLED METHOD AND SYSTEM FOR SECURE INFORMATION SHARING

CROSS-REFERENCE TO RELATED APPLICATIONS

This application claims priority of United States Provisional Patent Application Ser. No. 61/939,527 filed Feb. 13, 2014; and U.S. Provisional Patent Application Ser. No. 61/932,353 filed Jan. 28, 2014; and U.S. Provisional Patent Application Ser. No. 61/928,856 filed Jan. 17, 2014; and U.S. Provisional Patent Application Ser. No. 61/903,728 filed Nov. 13, 2013; the contents of which are incorporated herein by reference in their entirety.

FIELD OF THE INVENTION

The present invention in general relates to communications and in particular to a method and system for sharing information in a secure and time efficient manner while eliminating errors in the shared information through resort to a unique code via a different channel.

BACKGROUND OF THE INVENTION

There is often a need to exchange information between people who are not subscribers on the same network (i.e., Skype or Viber), or do not have each other's cell phone number, or for a number of reasons do not want to share their phone number. A good example is a phone call placed from a cell phone to a customer support agent on a land line. The customer support agent in this case will have access to the Internet, but unless the calling customer has the customer support email address, there is no venue to send information electronically to the agent. In order to provide an email address the caller to customer support has to supply the customer support agent with the email by spelling the email out over the phone. Such spelling is highly inaccurate and even if email address is captured correctly, the whole process is cumbersome and not a real time.

Furthermore, when a customer contacts a company for the first time or does not remember their account number, they are usually asked to provide their name, phone number, address, and other identifiable information. Providing information by the customer usually requires repeated spelling of their name and address, which once again takes valuable time and can be frustrating and prone to errors.

Thus, there exists a need for a time efficient method and system to securely share information while eliminating errors prior to communicating parties sharing their contact information or when such sharing is impossible or impractical.

SUMMARY OF THE INVENTION

A method of information exchange that uses a single identifier is provided that includes registering an end-point device of a (sending user) SU in a networked database by issuance of a Unique ID (UID) for the end-point device of the SU. The SU enters information into the end-point device of the SU and supplies the UID to a receiving user (RU). The RU enters the UID into the end-point device of the RU, a web browser, smart phone or another end-point device database interface to generate a query requesting the information from the end-point device of the SU. The information is then transmitted to the end-point device of the RU.

A method for electronic transaction between a sender user networked device of a sending user (SU) and a receiving user (RU) is provided with information of the SU stored on the sender user networked device. The sender user networked device is then registered in a networked database by issuance of a Unique ID (UID) for the electronic transaction, the UID being reserved and unavailable to others while the electronic transaction is pending. The UID is displayed on the sender user networked device. The SU supplies the UID to the RU in various ways such as orally. The RU enters the UID into a receiving user networked device or a web browser or another device interfaced with the database. A query requesting the information from the sender user networked device is generated in response to the RU entry of the UID, with the query displayed on the SU device. The SU then authorizes transmitting of the information in response to the query. The information is then transmitted to the receiving user networked device or the web browser. The electronic transaction between the sender user networked device and the RU is thus completed.

A method for electronic payment between a sending user networked device of a sending user (SU) and a receiving user (RU) is provided that includes payment information being entered and stored on the sending user networked device. The sending user networked device in is registered with a networked database by issuance of a Unique ID (UID) for the transaction, which is reserved and unavailable to other while the transaction is pending. The UID on the is displayed sending user networked device. The SU supplies the UID to the RU orally or through a separate route of electronic communication. Upon receipt of the UID, the RU enters the UID into a receiving user end-point device or a web browser connected to the database to create an authorization query to the sending user networked device. The query is displayed on the sending user networked device. The SU selects payment information on the sending user networked device and authorizes the transaction on the sending user networked device. Electronic payment information is then transmitted to the RU. A system for performing the method includes a server connected via a network to the end-point networked device of the SU and the end-point networked device of the RU. A memory system in electrical communication with the server containing a machine readable medium and having stored thereon one or more sequences of instructions which, when executed by a processor, cause the method to be carried out.

The present invention may be used to provide information to customer support, login into a web site, complete a web form, send a file, make a payment, and receive an appointment while never disclosing any permanent contact information about the sender if desired. In some embodiments, it may also be useful to transfer information into a mobile device from any medium.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
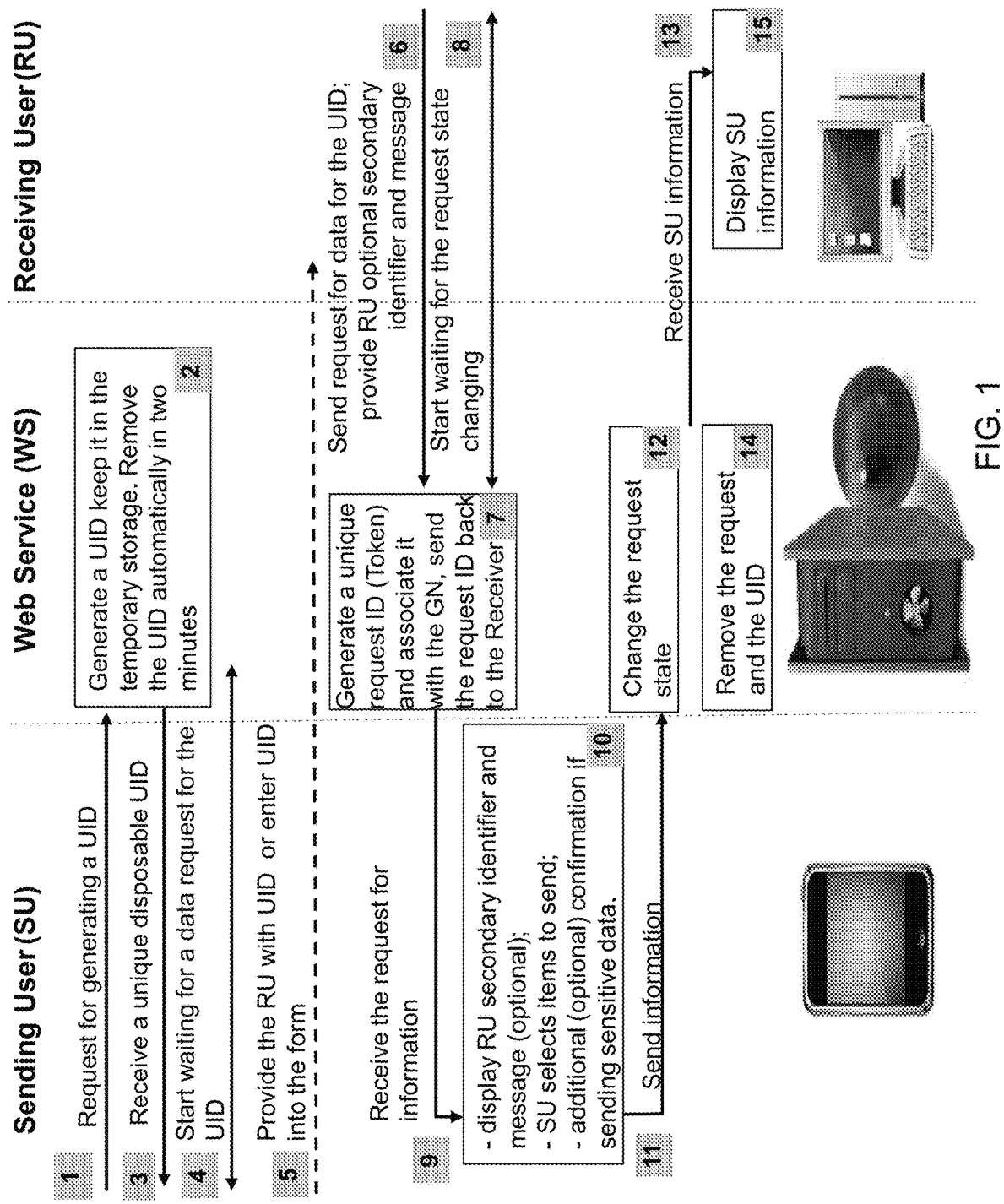
FIG. 1 is a flowchart of a method of sharing a document with a document identification according to embodiments of the invention.

The present invention has utility as a system and method to share information in a secure and time efficient manner while eliminating spelling and information transfer errors. Embodiments of the inventive system provide a convenient way to securely exchange subsets of information in real time between individuals and businesses. Embodiments of the inventive system are also useful for making a payment using a credit card or a bank account, logging into a web site, and under any other circumstances when information needs to be transferred between two network devices that are not uniquely identified on the same network (such as two Skype users who each must have an account on Skype network to communicate). Embodiments of the inventive information sharing platform enable a user to confirm in real time their intention to transfer information from their networked device to another specific user device and verify the identity of that user in real time before allowing the transfer to begin.

As used herein, an end user device is a personal computer, smart phone, tablet, or another end-point networked device that can store information.

In a specific embodiment of the present invention, a transfer of information may be accomplished as follows: A sending user (SU) that intends to send information provides a recipient user (RU) with a unique identifier (UID) for the information that the SU wants to send. The identifier is readily transmitted by email, voice over the phone, text message, mail, encoded by sound over the phone, or by any combination of such techniques. The unique identifier may be a numeric or alphanumeric string. In certain inventive embodiments, the unique identifier is a phone number, randomly generated number, or a number selected by the sending user; letters, picture, a sound, a bar-code, or a combination thereof. The recipient user (RU) enters the received unique identifier into their end-point device that triggers a request to the sending user to allow the information to be transferred. Upon receiving the request for sending information, the sending user who is authorized to grant the request either accepts or rejects the request. If authorization is granted, the information is transferred to the recipient user. In some inventive embodiments, SU authorization is not required and information transfer proceeds to the RU. For an added level of security, the request or unique identifier may have a time-limit, determined by a sending party and expires, once the limit is reached if the sending user has not acted on the request. In certain inventive embodiments, the information transfer is direct thereby avoiding copies remaining on intermediate servers that are prone to security lapses. Such a direct transfer is ideal for the transmission of sensitive personal and financial information, and as such is particularly well suited for financial and medical information exchange. Specific examples of a request may involve at least one of attending an appointment, returning a defective product, transferring funds, exchanging merchandise, or exchanging software, etc.

When embodiments of the inventive method to securely share information are implemented as an email or email add-on, the sending user is asked whether they want to send regular email or "secure email". If the sending user chooses, "secure email", the receiving user is sent an email which only contains a UID for the information to be sent. Upon receiving, the add-on email, the receiving user's computer transforms the UID into an executable command which generates a request to the sending user to obtain the actual information contained in the email. Alternatively, the receiving user may be required to use other means to request information from the sender such as calling the sending user on the phone to request the information using that UID. This may be desirable in a case where the sending user wants to be sure that the receiver is actually the one requesting information. In some inventive embodiments, once the UID of the information is sent to the receiving user, the information itself is temporarily moved from the sending user's computer to the cloud or to a phone or any other device selected by a sending user. The UID can also be transmitted orally during a call between the SU and RU. Once the authorization is granted, the information is moved to the receiving user from the cloud, phone, or any of the other devices that have the information. In certain embodiments the information is deleted from the cloud following the transfer of information to the receiving user.

Unlike file sharing or instant messaging, the communicating parties (sending user, receiving user) do not necessarily need to be registered in the same network (such as Skype or Facebook users) and may remain completely anonymous. When the need to exchange information arises, one of the users generates a UID. When the receiving user enters the sending user's UID into the database, the sending user receives a notice that the receiving user is attempting to access the sending user's information, and the sending user has an option to authorize or decline the request. The sending user has also an option to define a subset of its data to which access is authorized and define the duration of the access. In certain inventive embodiments, the information transfer is automatically terminated with the end of the phone call or another predetermined event occurs.

It is noted that the sending and/or receiving users or parties may be individuals, businesses, or automated or computerized entities, such as a voice response system with voice recognition, or a web site in any pairing combination. Embodiments of the inventive information sharing platform may be Internet based and accessed via a website with a graphical user interface (GUI) such as a browser. In a specific inventive embodiment, a sending user may choose from a list the kind and type of information to authorize to be sent to the receiving user.

FIG. 1 is a flowchart of an inventive method for securely sharing information between two users using a single UID.
1. The Sending User (SU) initiates a transaction from an app (i.e., app, web page form, etc.) menu. The app sends a request for generating a unique identifier (UID) to the Web Service (WS).
2. The WS generates UID, assigns this UID to the transaction and keeps it in its temporary storage with the status "pending". The WS cleans the temporary storage by removing disposable numbers that are older than predetermined amount of time.
3. The SU app shows the "Please wait" dialog while connecting to the web service and receiving disposable UID.
4. Having received a valid disposable UID the app displays the "Waiting for request" dialog to the SU while querying the WS every second (or another pre-determined period of time) checking the status of the UID in background. If there is no change in the UID status after the pre-determined period of time has expired, the app cancels the transaction and sends the web service the cancel command that removes the UID from the temporary storage on the web service. If SU clicks "Cancel Transaction" button while waiting then the transaction cancels and the app sends the web service the cancel command. WS may also cancel and dispose the UID without receiving any command from the app after pre-determined period of time.

5. The SU provides the UID to the Receiving User (RU) or enters it into the form. If the SU is using the UID, for example, to purchase an item on line then SU and RU can be the same person. There are other multiple scenarios when the SU and RU is the same person: when a user is transferring information from one of their devices to another, when a user desires to post something on a web forum from one of their devices etc.

6. The RU enters the UID provided by the SU into the form on their app, a web page, or any other device networked with the WS along with RU secondary identifier (name, number, picture, or anything else that would enable the SU to verify that RU is an intended recipient of the information). The RU may also enter a message at this stage. When the RU submits the form, the request containing the UID (provided by the Sender), that can include an optional RU secondary identifier or an optional message is sent to the WS. The second identifier is transmitted to the end-point device of the SU along with the query and displayed on said sending user networked device. In this way, the SU can verify that RU is the intended recipient of the information.

7. The WS checks if the UID submitted by the RU exists and that the UID is not in use by another transaction. If the UID exists and is available for the transaction, the WS generates a unique request ID (Token), associates it with the UID and changes the UID status to "reserved" to prevent using the UID in another transaction. If the UID does not exist, the UID is already processed or in use by another transaction then the WS responds with an error.

8. The RU app receives back the Token. The RU app begins querying the WS in the background waiting until the SU information becomes available at the WS and is associated with Token. The web app may be configured so that the waiting time would be limited. In this case the web app cancels the request if a timeout occurs.

9. The SU app determines that the status of the UID at the WS is changed to "reserved" and retrieves a RU secondary identifier and the message, if available.

10. The SU app displays the RU secondary identifier and message to the user if they are provided (if not provided, displays "unknown") letting the SU know that the RU is ready to accept information and prompts the SU to select information to be sent to the RU. If there is sensitive data selected to send then the app displays a warning and requests the user's confirmation. The user can cancel the transaction.

11. If the SU authorizes information transfer, the app forwards SU information to the WS.

12. The WS associates the SU information with the Token and changes the UID status to "available".

13. The RU app determines that the SU information became associated with the Token, retrieves this information to the RU and exits a polling cycle.

14. The UID status is changed to "completed" and the UID, Token and the associated information is removed from the WS.

15. The RU app displays information received from the SU or a diagnostic message if the SU has canceled the transaction.

In order to increase system efficiency, the SU information may be forwarded to the WS after the UID is generated, but before the RU makes a request using the UID. The UID can be represented by sound or picture.

The system can make visible to the RU only a fraction of information submitted by a SU. For example, in case of a financial transaction, the RU may be able to see the SU name and shipping address, but not the credit card information. In this example, financial information will only be seen by the credit card processing company. The SU may choose what information is to be sent, before the app contacts the server for generating the UID.

Figure 2:
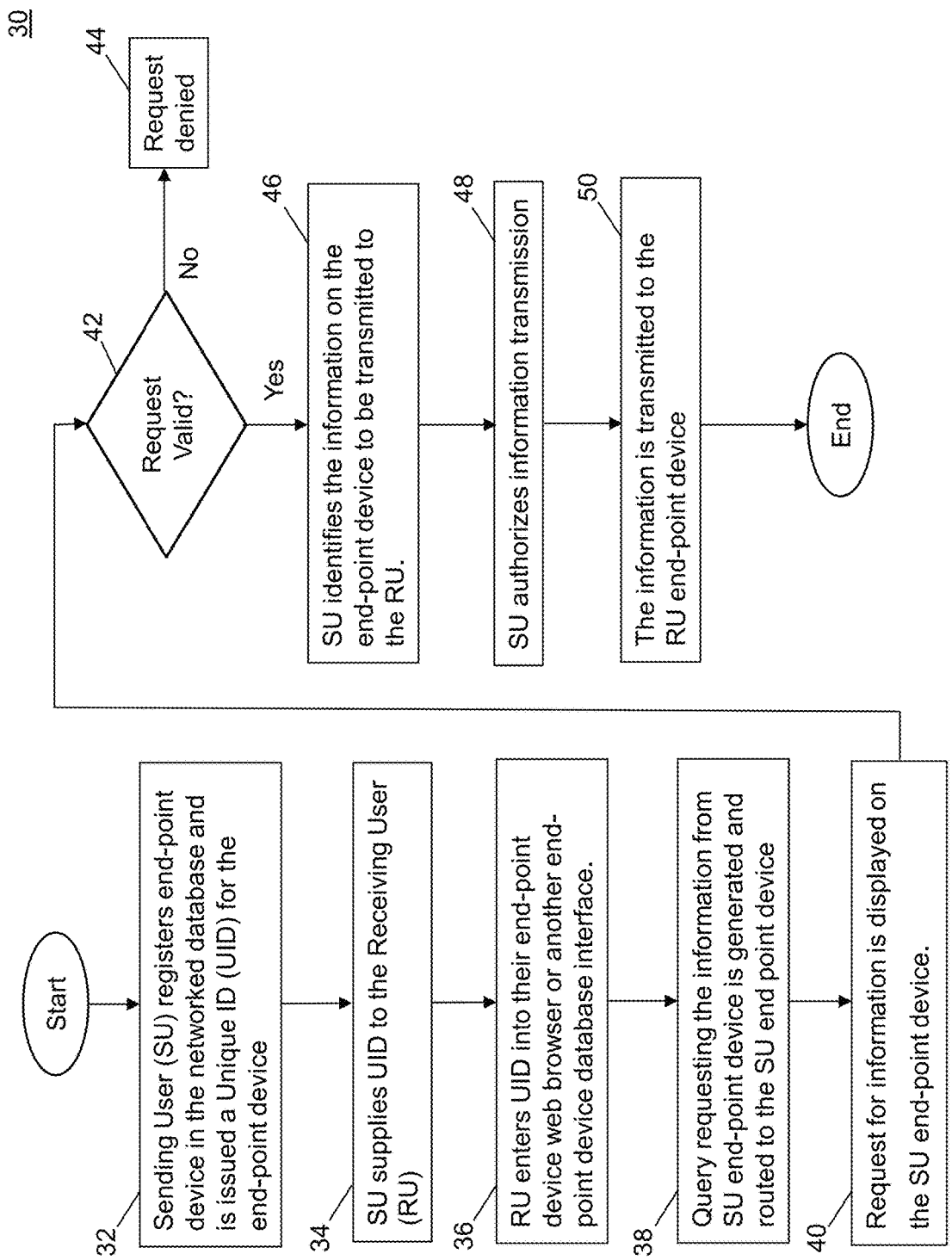
FIG. 2 is a flowchart of a method for sharing information between networked devices according to embodiments of the invention.
Figure 3:
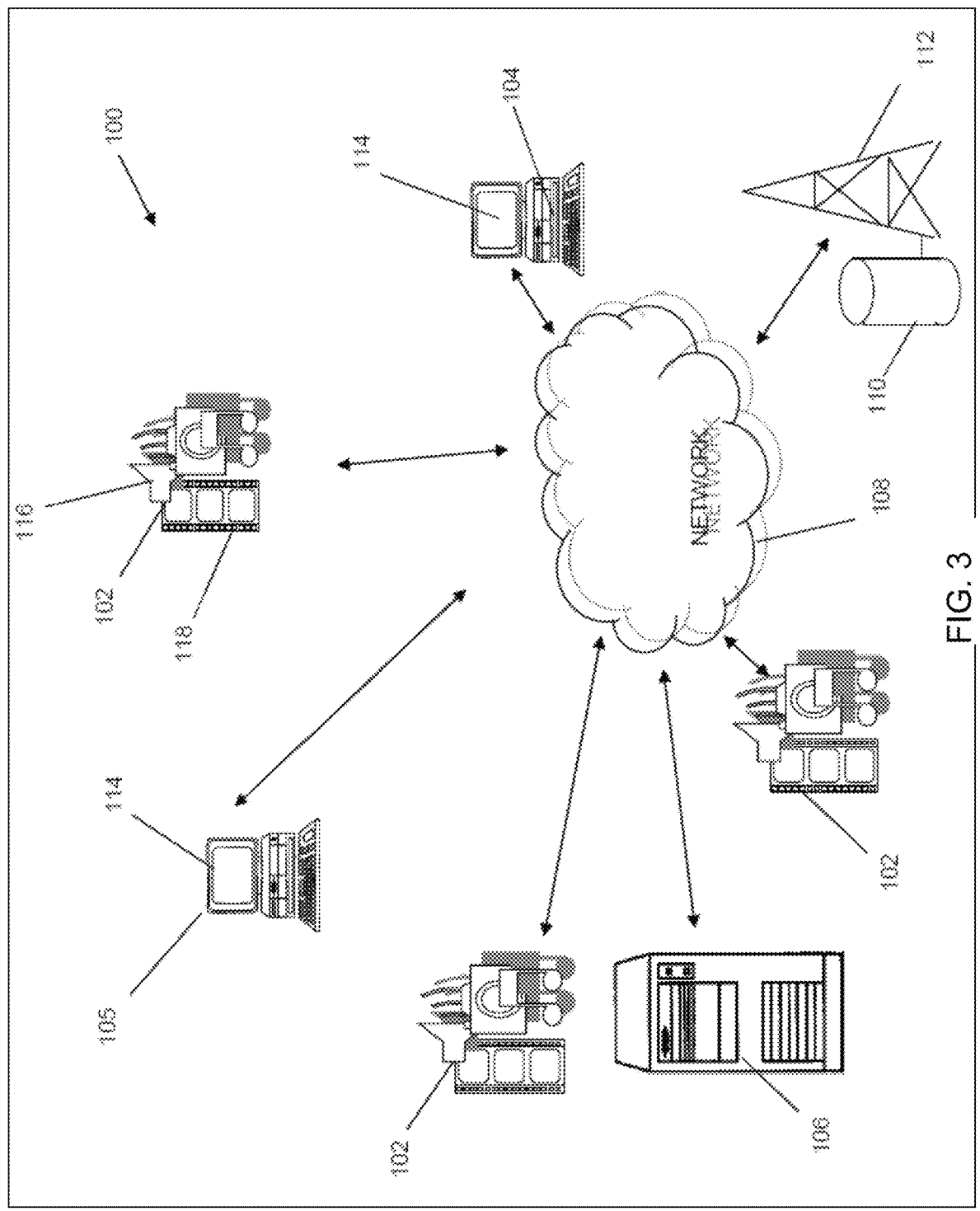
FIG. 3 is a schematic diagram illustrating an overall view of communication devices, computing devices, and mediums for implementing embodiments of the invention.

FIG. 2 is flowchart showing an embodiment of an inventive process as practiced by a system per FIG. 3. The process of FIG. 2 is shown generally at 30. To start the process 30, a sending User (SU) registers an end-point device in the networked database by issuance of a Unique ID (UID) for the end-point device of the SU at step 32. The SU supplies the UID to the Receiving User (RU) at step 34. In certain embodiments, the SU in this process 30 is a customer accessing business information or seeking customer service support from the RU customer support agent. The RU then enters the UID into their end-point device, web browser or another end-point device database interface along with information to be transmitted to the SU at step 36. In some embodiments, the RU attaches a file or message in response to entering the UID that is transmitted to the sender user networked device. It is appreciated that this completes an information exchange according to the present invention. In certain embodiments, the query containing the information from SU end-point device is generated and routed to the SU end-point device at step 38; and the SU is given the ability to authorize the SU information transfer to RU to complete an inventive process. In instances when no such authorization is granted and required to complete the information exchange, then no information exchange occurs and the transfer is cancelled. It is appreciated that the UID is a single use numerical value or is permanently associated with the SU. At step 40, the request for information is displayed on the SU end-point device. At step 42, a determination is made if the request is valid. If the request is not valid (Decision step 42 is No) the request is denied at step 44. If the request is valid (Decision step 42 is Yes) the request is granted, and the SU identifies the information on the end-point device to be transmitted to the RU at step 46, and the SU authorizes the information transmission transfer at step 48, and transmits the information to the RU end-point device at step 50.

FIG. 3 is a schematic diagram illustrating an overall view of communication devices, computing devices, and mediums for implementing the platform according to embodiments of the invention. The elements of the embodiments of FIGS. 1 and 2 are included in the networks and devices of FIG. 3.

The system 100 includes an networked device 102 and desktop computer devices 104 configured with display capabilities 114 and processors for executing instructions and commands. It is appreciated that the networked device 102 in most instances is an end use device. The networked device 102 is in certain embodiments mobile communication and entertainment devices, such as cellular phones, tablets, and mobile computing devices that in certain embodiments are wirelessly connected to a network 108. The end-point device 102 typically has a video displays 118 and audio outputs 116. The end-point device 102 and desktop computer devices 104 are in some embodiments configured with internal storage, software, and a graphical user interface (GUI) for carrying out elements of the platform according to embodiments of the invention. The network 108 is any type of known network including a fixed wire line network, cable and fiber optics, over the air broadcasts, satellite 120, local area network (LAN), wide area network (WAN), global network (e.g., Internet), intranet, etc. with data/Internet capabilities as represented by server 106. Communication aspects of the network are represented by cellular base station 110 and antenna 112. In certain inventive embodiments, the network 108 is a LAN and each remote device 102 and desktop device 104 executes a user interface application (e.g., Web browser) to contact the server system 106 through the network 108. Alternatively, the devices 102 and 104 may be implemented using a device programmed primarily for accessing network 108 such as a remote client.

The software for the platform, of embodiments of the invention, may be resident on the individual end-point device 102 and desktop computers 104, or stored within the server 106 or cellular base station 110. Server 106 may implement a cloud-based service for implementing embodiments of the platform with a multi-tenant database for storage of separate client data.

It is appreciated the use of a UID as part of an inventive information exchange provided a business with statistical data to evaluate customer service transactions. Statistics can be of benefit to evaluation aspects such as time devoted to a given customer transaction, success rate of customer transaction to resolve issues, comparison between phone operator and web-based transactions, and usage of the inventive process relative to conventional processes.

The present invention is further detailed with respect to the following non-limiting examples. These examples illustrate specific relationships between customer service and a customer, and algorithms according to the present invention. It is appreciated that the present invention is not limited to customer support.

Example 1

Customer (SU) makes a telephone call to customer support and provides a UID. Customer support (RU) enters the UID into the web form and this triggers a request to the customer's "fixed" information, such as name, email, address, credit card or bank account information, insurance number, web site login, file, as well as their location (for example for a roadside emergency service). The customer (SU) selects which information to send and authorizes sending information (after receiving notification or by starting an application). This use case can be completely automated, wherein the customer can enter their number on a dial pad when prompted to do that by an automated outgoing recording.

Algorithm

The customer (SU) installs an app on a multimedia device, and then completes the fillable fields with information (e.g., one or more of name, product code of purchase, customer number, email, credit card number, etc.). While on the telephone call with customer support (RU), the UID is created for the SU device, and is registered in the central database and becomes unavailable to others. The SU provides the UID to the RU, who enters the UID into the form (a request is sent to the central database). It is appreciated that this step can be completely automated on a business side by offering the SU an option to enter their UID after an automated voice prompt. The SU receives a request for information which identifies the RU as a receiver. The SU then authorizes the uploading of information that the SU selects. The RU web form, routinely queries the centralized database for the customer's reply to determine that such a reply is available. When the information is available on the database, the data then transfers into the RU web form. Customer supplied information, or a subset of such information, is then displayed to the RU. The web form can export data into other formats convenient for customer support. It is appreciated that this algorithm is also operative for any two users, when a call is made to a land line or for any other reasons text messaging or email use is not practical. RU may be required to register before being able to receive SU information.

Example 1 may have a provision that a disposable UID is generated and is expunged from the database along with sent information (if uploaded) once the transaction is completed or a preselected time has lapsed. Here, the customer (RU) makes a telephone call to support and selects on their multimedia device application the data items they want to send, and then their phone app generates a UID number that is either disposable or permanent. The customer (RU) then provides their UID to the customer support (SU). Once support transfers information, temporary the UID disappears from the system in certain embodiments and can be recycled for another transaction, or else the UID is retained with a customer association.

In a payment transaction, between a sending user networked device of a sending user (SU) and a receiving user (RU), payment information is entered and stored on the sending user networked device. The sending user networked device is registered in a networked database by issuance of a Unique ID (UID) for the transaction, which is reserved and unavailable to other while the transaction is pending. The UID is displayed on the sending user networked device, and then supplied to the RU orally via phone or in person. The RU then enters the UID into a receiving user end-point device or a web browser connected to the database thereby creating an authorization query to the sending user networked device. The query is then displayed on the sending user networked device. The SU then authorizes the transmission of payment information to the complete the transaction from the sending user networked device. While electronic payment information is transmitted to the RU, it is appreciated that such information is readily protected so as not to be seen by the RU through encryption or other techniques conventional to the art. RU in some embodiments also enters an amount to be paid and then transmits the amount to be paid to the sending user networked device of the SU. In the case of certain financial transactions, the RU may be able to see SU name and shipping address, but not the credit card information. In this example, financial information will only be seen by credit card processing company.

With the UID being a front form the transaction, credit card information can be kept hidden and secure from a merchant whether paying online or in person at a point of sale. To accomplish this, the UID can be loaded in the form that is submitted to the payment gateway (i.e., Authorize.net) in such way that the merchant can never see the details of the payment vehicle (i.e., credit card). Payment information illustratively includes a debit card, credit card, a bit coin, or a bank draft. To protect the SU payment information, the RU can be an approved merchant who has been vetted and verified. In still other embodiments, information about the RU the is displayed on the sending user networked device as a part of the query.

In case of financial transaction, the query to the SU may contain the amount to be charged, merchant ID and other information required to facilitate the transaction. Alternatively, the amount to be charged may be entered by the SU before authorizing the transaction.

In some embodiments, the same person can act as both, SU and RU. For example, while making a payment on the web site or logging into the web site or completing a form on the web site. First the person acts as a SU generating the UID, then acts as a RU by entering the generated UID into the respective form and then again as a SU by authorizing information transfer from his end-point device.

Example 2

While on the phone, the customer (RU) requests that their appointment information be sent to them by a healthcare provider's office (SU). The RU provides the SU with a UID. The SU enters the RU's UID into the appointment form along with appointment information. The appointment information then arrives to the RU mobile device.
Algorithm The algorithm of Example 1 is used herein with the proviso that the query for information sent from the customer support includes appointment information (or any other information that customer requested). Since no information is actually requested from the customer, they do not have to perform any actions to accept the query and this completes the transaction.

Example 3

A customer when searching for a business on a desktop PC and jumping into the car to drive to the business, rather than emailing found business information to himself or jotting the information onto a piece of paper, the customer (SU) gets information using UID of a business of interest. A given business or individual or an event is registered for a UID and the UID has linked information that illustratively includes one or more of address, phone, hours of operation, current promotion, or combinations thereof. The UID linked information resides in the database, and in some embodiments only enters the database for a transient single usage. In still other embodiments, the business does have an option to store UID linked information on the customer end-point device. No authorization by a business is required to retrieve UID linked information by customer.

The UID is published on the business web site along the phone number. In this way, a customer looking for business information enters the UID of the business into their UID application on an end-point device (or a web form) and this transfers business information into their UID application (or web form). In another inventive embodiment, a script is provided on a business web site where a customer enters their UID and the business information is sent to their end-point device application.
Algorithm The business registers on a UID network and is issued a UID to share with customers or potential customers. The business also completes a form providing information to be transferred to the customer when the business UID is queried. A customer runs a UID application on the multimedia device, and enters the business unique UID. This situation results in a query to the database being generated and business information being transferred to customer's multimedia device.

An alternative algorithm embodiment has a customer access the business web site and enters his (customer's) UID into the form where the business of interest UID is already preloaded, resulting in query containing business information being sent to the central database with customer's UID. A customer UID application then retrieves data from the query containing business's information on a customer end-point device.

The present invention also affords a method for contact information and promotions to a mobile device of a user to be communicated by a business to an end user by creating an online contact card containing contact information and promotions. A number or a word by way of example is chosen as a handle to access the contact card. A user installing a software application on the mobile device retrieves the contact card using the number or the word as a handle. The handle is then used to keep information on the mobile device up-to-date by creating a periodic request to the said contact card.

It is appreciated that information transfer in this case or any other use case can be a computer file. It is further appreciated that as an alternative to a centralized database to store information waiting for query, such queries may be organized as a pipe that merely relates information between two end-point devices.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The foregoing description is illustrative of particular embodiments of the invention, but is not meant to be a limitation upon the practice thereof. The following claims, including all equivalents thereof, are intended to define the scope of the invention.

What is claimed is:

1. A method for sending information between a first device and a second device comprising:
establishing a connection between the first device and a web service;
requesting a unique session ID to be issued and stored by the web service;
receiving the unique session ID by the first device from the web service;
providing the unique session ID from the first device to the second device;
waiting for a notification from the web service, by the first device, that the unique session ID from the second device has been received; and
responsive to receiving the notification, by the first device, from the web service, identifying the information on the first device to be sent to the second device, and sending the identified information to the second device.

2. The method of claim 1, further comprising:
receiving information, by the first device, wherein the information comprises an identification of a user of the second device.

3. The method of claim 1, wherein the communication of the unique session ID is via a bar code.

4. The method of claim 1, further comprising:
establishing a predetermined period of time for the waiting for the notification; and
responsive to detecting the predetermined period of time and an absence of the notification, releasing the unique session ID.

5. The method of claim 1, further comprising:
releasing the unique session ID after sending the identified information.

* * * * *